United States Patent [19]

Miller

[11] Patent Number: 5,266,368

[45] Date of Patent: Nov. 30, 1993

[54] BIODEGRADABLE PACKING MATERIAL AND METHOD

[75] Inventor: Kent R. Miller, Wilson, Wis.

[73] Assignee: International Grain & Milling Company, Clara City, Minn.

[21] Appl. No.: 869,806

[22] Filed: Apr. 16, 1992

[51] Int. Cl.⁵ .............................................. B29C 67/22
[52] U.S. Cl. .................................. 428/35.6; 53/472; 206/584; 206/814; 264/53; 264/118; 264/141; 264/DIG. 5; 521/84.1
[58] Field of Search ............... 264/109, 118, 141, 142, 264/53, DIG. 5; 206/523, 584, 814; 53/472; 220/DIG. 30; 428/35.6, 402; 521/79, 84.1

[56] References Cited

U.S. PATENT DOCUMENTS

| | | | |
|---|---|---|---|
| 4,863,655 | 9/1989 | Lacourse et al. | 264/53 |
| 5,035,930 | 7/1991 | Lacourse et al. | 428/35.6 |
| 5,043,196 | 8/1991 | Lacourse et al. | 428/35.6 |

*Primary Examiner*—Mary Lynn Theisen
*Attorney, Agent, or Firm*—John W. Adams

[57] ABSTRACT

A biodegradable low density packing material, comprising an expanded wheat and starch product having high dimensional stability at high humidity and temperature ambient conditions. The invention also includes a method of preparing a low density biodegradable packaging material having a blended mix of wheat, amylose starch and amylopectin starch with approximately 1% gelatin being added after the initial mixing of the product at temperatures of 300° to 350° F.

5 Claims, No Drawings

BIODEGRADABLE PACKING MATERIAL AND METHOD

BACKGROUND OF THE INVENTION

This invention relates to a biodegradable protective low density packaging material and method for making the same.

High amylose starch packaging materials have been widely known for several years. One example of such a product is disclosed and claimed in U.S. Pat. No. 4,863,655, issued Sept. 5, 1989. The expanded product, disclosed in this patent, requires at least 45% amylose content by weight. This high amylose starch content is costly and also makes the product very susceptible to shrinking and deterioration in hot humid storage conditions. The end product must be resilient and dimensionally stable within the temperatures encountered during shipping and storage. The product must also be liquid soluble, biodegradable, compostable and made from renewable (recyclable) ingredients.

SUMMARY OF THE INVENTION

This invention embodies the use of wheat, low grade starch containing amylopectin, less than 40% high amylose starch and a small amount of gelatin to produce an extruded, low density, biodegradable packaging product. The mixture of these ingredients, as prescribed herein, produces an amylose starch content in the product of less than 40% (preferably in the range of 20 to 35%) which has been found to provide improved dimensional stability under high humidity and high temperature storage conditions and substantially decreases the cost of the product when compared with a product having a higher amylose content starch.

This invention also embodies the method for producing a biodegradable packaging product, having a low percentage of amylose starch, which method includes mixing, at approximately 300° to 350° F., the preblended ingredients in a conditioning cylinder into which steam and water (and a color dye, if desired) are introduced) and wherein the ingredients include less than 40% (approximately 35%) amylose starch, amylopectin (low grade corn) starch (approximately 14%) and a small amount of gelatin (approximately 1%), all blended with approximately 50% milled wheat farina (such as from durum wheat), and extruded from a cooking extrusion machine.

DETAILED DESCRIPTION OF THE PREFERRED EMBODIMENT

The preferred form of this invention embodies the production of a biodegradable, low density packaging material. It has been found that a cereal-snack cooking extruder, Model 525, manufactured by Extru-Tech, Inc., of Sabetha, Kans. is satisfactory for producing this product. This machine has a conditioning cylinder which mixes the ingredients and which delivers the mixed ingredients to a continuous feed and transport section, a cooking section and high shear/high pressure discharge section which discharges the material through an extrusion die. The continuous extruded cylindrical rope product is cut off by rotating cutter blades which produce the desired length of each piece of the low density packaging product produced. The high protein material embodying this invention has extremely high dimensional stability even in high temperature and high humidity ambient conditions.

The ingredients are preblended prior to mixing in the conditioning cylinder. The preblended mix includes approximately 50% wheat, from 20 to 30% amylose starch product, between 20 and 30% amylopectin starch. Approximately 1% gelatin is added after initial conditioning. The mixture, without the gelatin, is mixed in a conditioning cylinder for approximately 20 minutes. During this premixing operation, steam and water is injected at approximately .56 lbs per minute wherein the water is approximately 55 F, and the steam is injected at approximately 2 psi. The ultimate mixing temperature produced in the conditioning cylinder reaches between 300° and 350° F. Before being discharged from the initial mixing and conditioning cylinder, the 1% gelatin is added and the product mixture is delivered to a feed and transport head which, in turn, delivers to a cooking chamber. The material is transported to a high temperature/high shear delivery auger which produces 1000 and 1,200 psi on the mixture. The material is delivered from the cooking head into the high shear/high pressure discharge chamber, from which the material is forced through a multiport extrusion die, cut off by a multiple-blade rotating cutter, the speed of which determines the length of the individual pieces produced. The pieces are then delivered to a cooling belt and ultimately packed in suitable bags for storage and transport.

The use of the inexpensive low grade amylopectin starch and high percentage of wheat reduces the cost of the product, increases the durability and dimensional stability of the product under high temperature storage conditions while still producing a product having satisfactory biodegradability.

What is claimed is:

1. An expanded biodegradable low density packaging material, comprising approximately 50% wheat, between 20% and 30% amylose starch, between 20% and 30% amylopectin starch, and approximately 1% gelatin.

2. An expanded biodegradable low density packaging material, comprising 50% durum wheat, approximately 24% amylose starch, 25% amylopectin starch and 1% gelatin.

3. The method for producing biodegradable low density packaging material comprising preblending a mixture of approximately 50% milled wheat farina, 20% to 30% amylose starch, 20% to 30% amylopectin (low grade corn) starch, mixing said blended mixture while injecting steam and water at between 300° to 350° F., adding 1% gelatin after said mixing process and extruding the mixture at between 1000 and 1200 psi through an orifice while cutting off the extruded ribbon to produce the packaging product having the desired size.

4. The method set forth in claim 3 wherein the approximate percentage of ingredients is 50% durum wheat, mixed with approximately 24% amylose starch, 25% amylopectin starch and approximately 1% gelatin.

5. The method set forth in claim 3 wherein the wheat produces approximately 11.9% amylose starch, the low grade corn starch produces approximately 6¼% amylose starch, and the high amylose starch provides 17.5% of the amylose content of the product and the amylose content constitutes approximately 35.65% of the entire mixed product.

* * * * *